Figure 1:
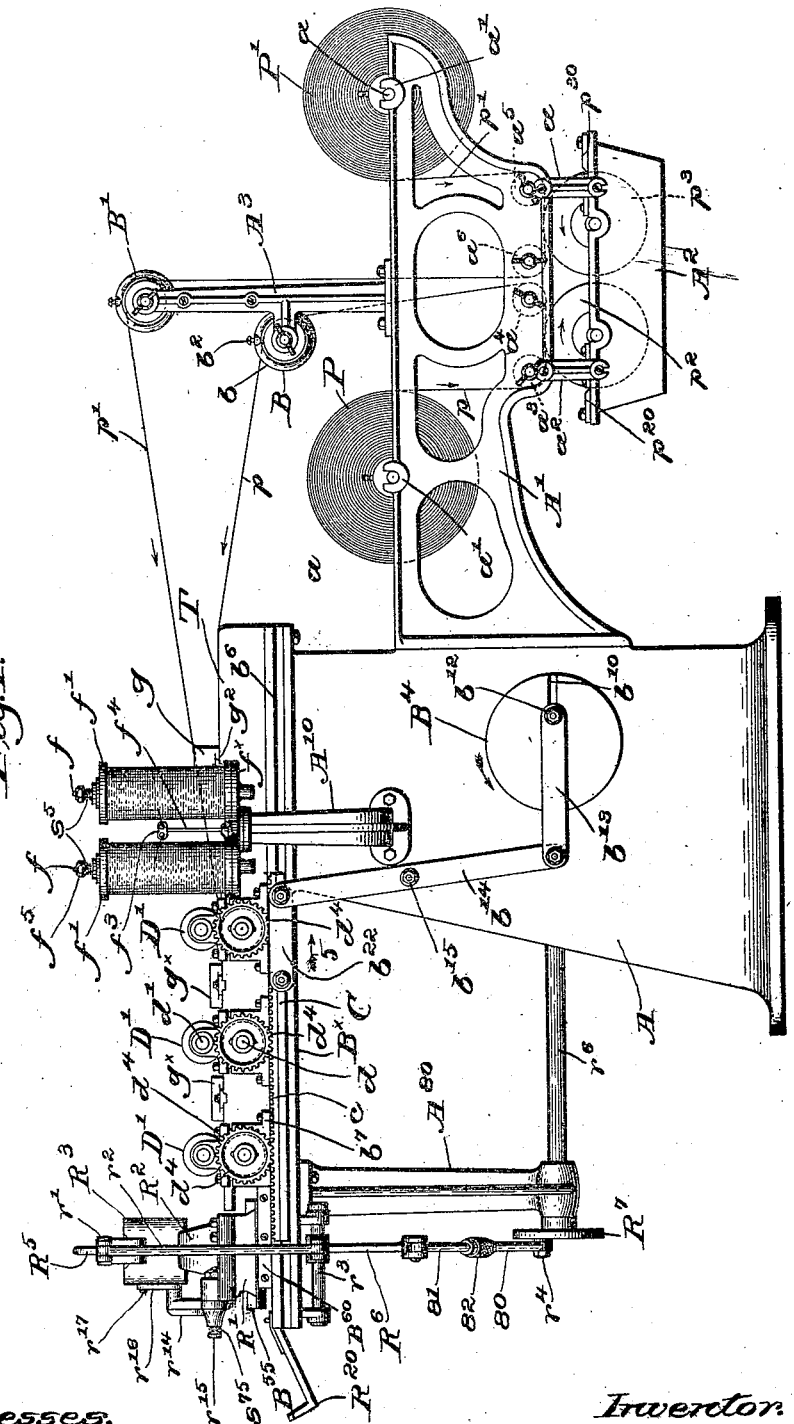

No. 648,793. Patented May 1, 1900.
G. L. REENSTIERNA.
MACHINE FOR MAKING TAGS.
(Application filed May 16, 1899.)
(No Model.) 6 Sheets—Sheet 1.

Witnesses.
Thomas J. Drummond.
Gustav F. Magnitzky.

Inventor.
Gustaf L. Reenstierna.
By Crosby & Gregory
attys.

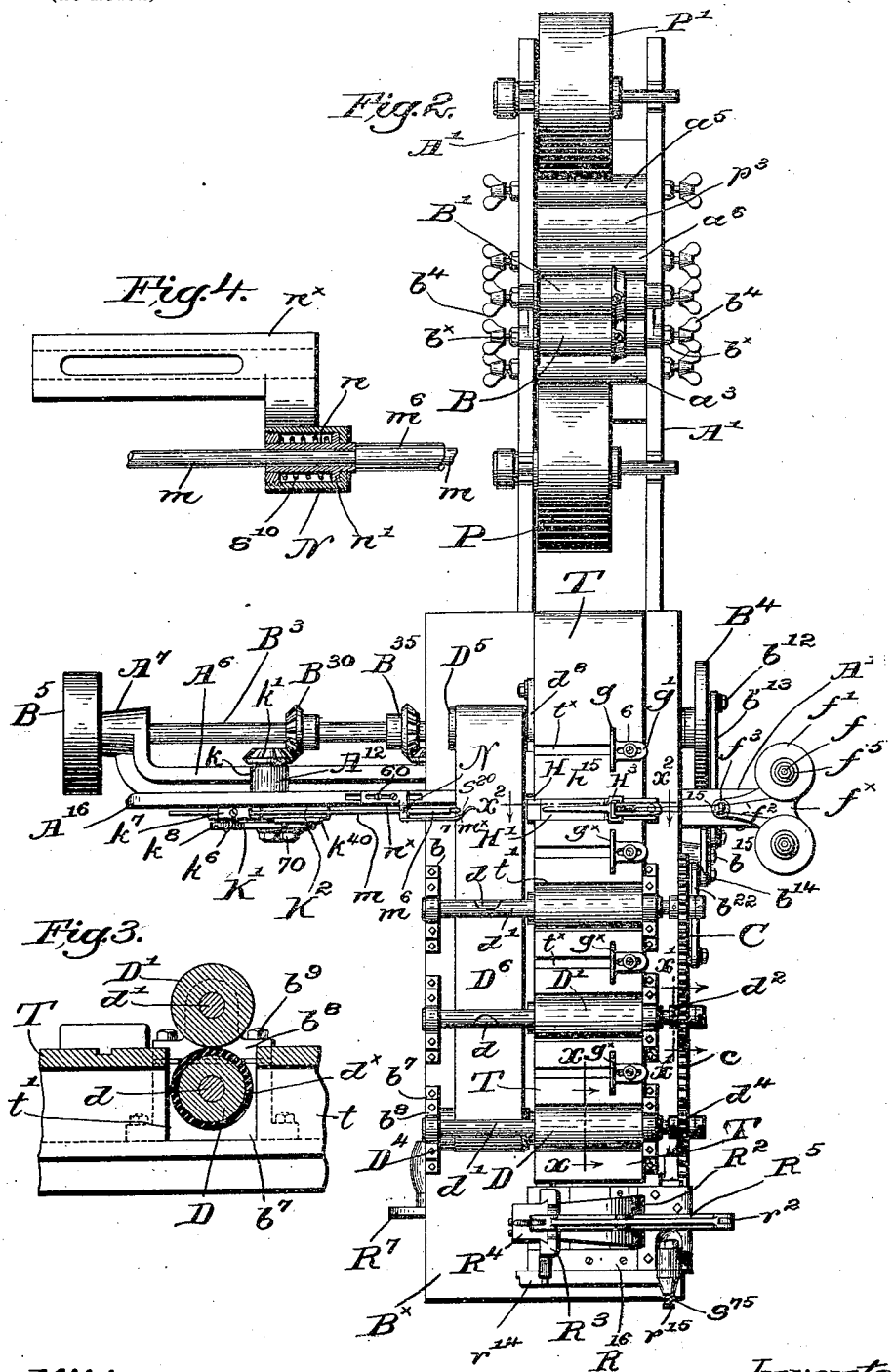

No. 648,793. Patented May 1, 1900.
G. L. REENSTIERNA.
MACHINE FOR MAKING TAGS.
(Application filed May 16, 1899.)
(No Model.) 6 Sheets—Sheet 3.

Witnesses.
Thomas J. Drummond
Gustav F. Magnitzky

Inventor:
Gustaf L. Reenstierna.
By Crosby Gregory attys.

No. 648,793. Patented May 1, 1900.
G. L. REENSTIERNA.
MACHINE FOR MAKING TAGS.
(Application filed May 16, 1899.)
(No Model.) 6 Sheets—Sheet 4.
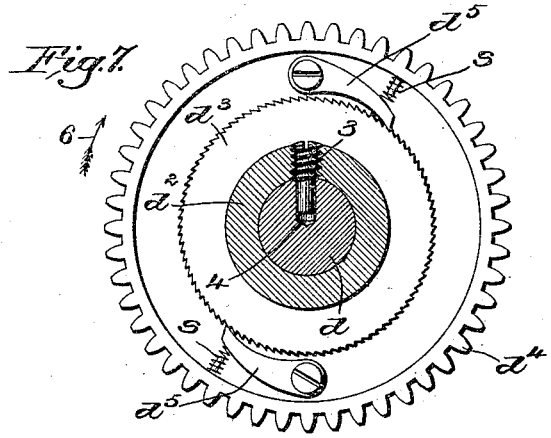
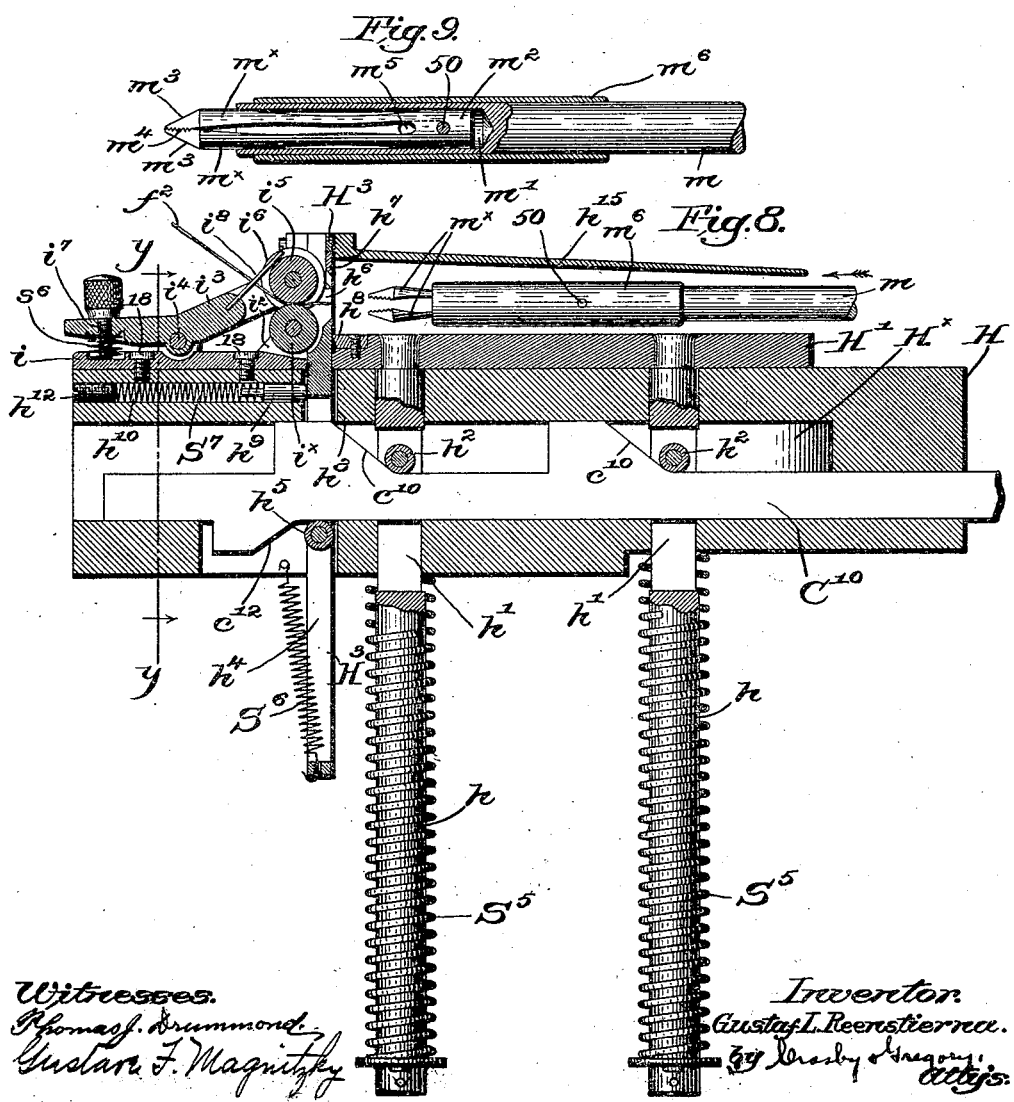
Witnesses. Inventor.

No. 648,793. Patented May 1, 1900.
G. L. REENSTIERNA.
MACHINE FOR MAKING TAGS.
(Application filed May 16, 1899.)
(No Model.) 6 Sheets—Sheet 6.
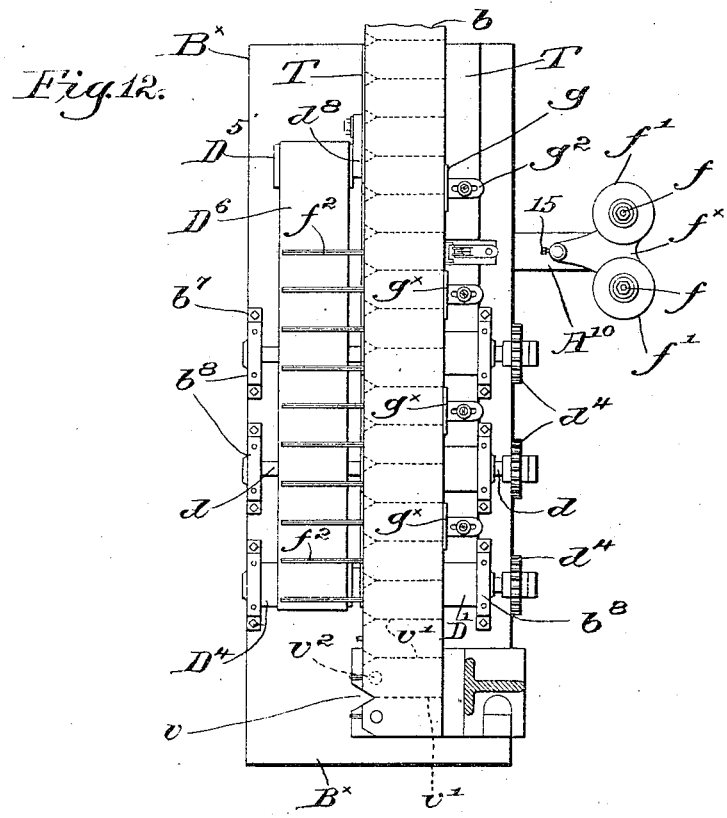
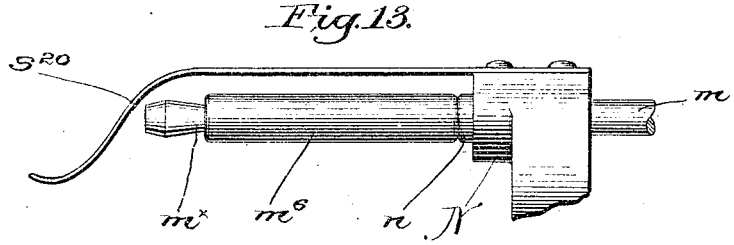

UNITED STATES PATENT OFFICE.

GUSTAF L. REENSTIERNA, OF BOSTON, MASSACHUSETTS, ASSIGNOR TO EDWARD A. BANGS, OF SAME PLACE.

MACHINE FOR MAKING TAGS.

SPECIFICATION forming part of Letters Patent No. 648,793, dated May 1, 1900.

Application filed May 16, 1899. Serial No. 716,995. (No model.)

*To all whom it may concern:*

Be it known that I, GUSTAF L. REENSTIERNA, of Boston, county of Suffolk, State of Massachusetts, have invented an Improvement in Machines for Making Tags, of which the following description, in connection with the accompanying drawings, is a specification, like letters and figures on the drawings representing like parts.

This invention has for its object the production of apparatus for making rapidly, accurately, and cheaply merchandise and shipping tags, preferably from manila or other strong and flexible material, my invention being more particularly designed for the production of "string-tags" such as form the subject-matter of United States Patent No. 615,637, dated December 6, 1898. The tag shown in said patent is provided with a flexible strengthening member—such as a cord, string, tape, or wire—traversing it continuously from end to end between its opposite faces and at or near the longitudinal center of the tag-body, the end of the flexible fastener extending beyond one end of the tag to provide an attaching portion therefor.

In the present instance of my invention the tags are made of two superposed layers, sheets, or plies of paper or other suitable material cemented or otherwise secured together and to the flexible strengthener, the two plies of material being herein shown as fed each from a continuous strip or web of the proper width and brought into intimate contact with each other after the strengthener has been laid in position transversely to the length of the web by the action of drawing-in mechanism. Means are provided for severing the strengthening member adjacent one edge of the superposed plies, and I have herein shown means to cut the tags from the twofold web as it passes from the apparatus.

Various novel features of my invention will be hereinafter described in the specification and particularly pointed out in the following claims.

Figure 5:
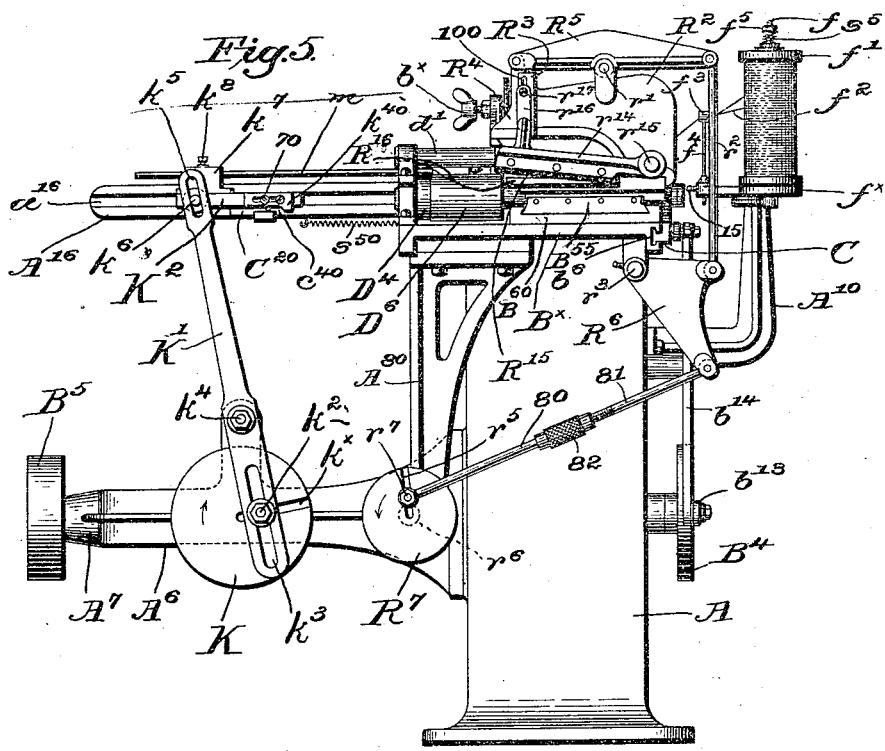
Figure 6:
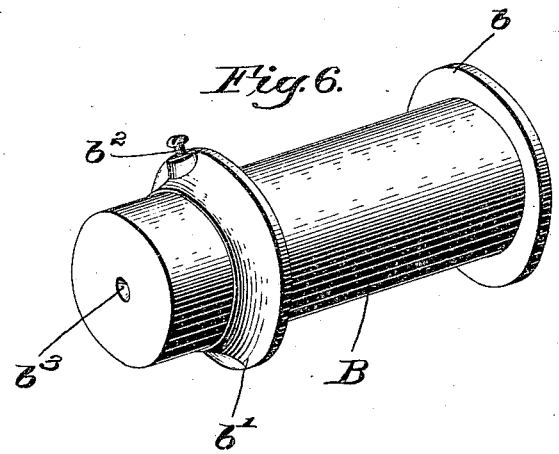
Figure 10:
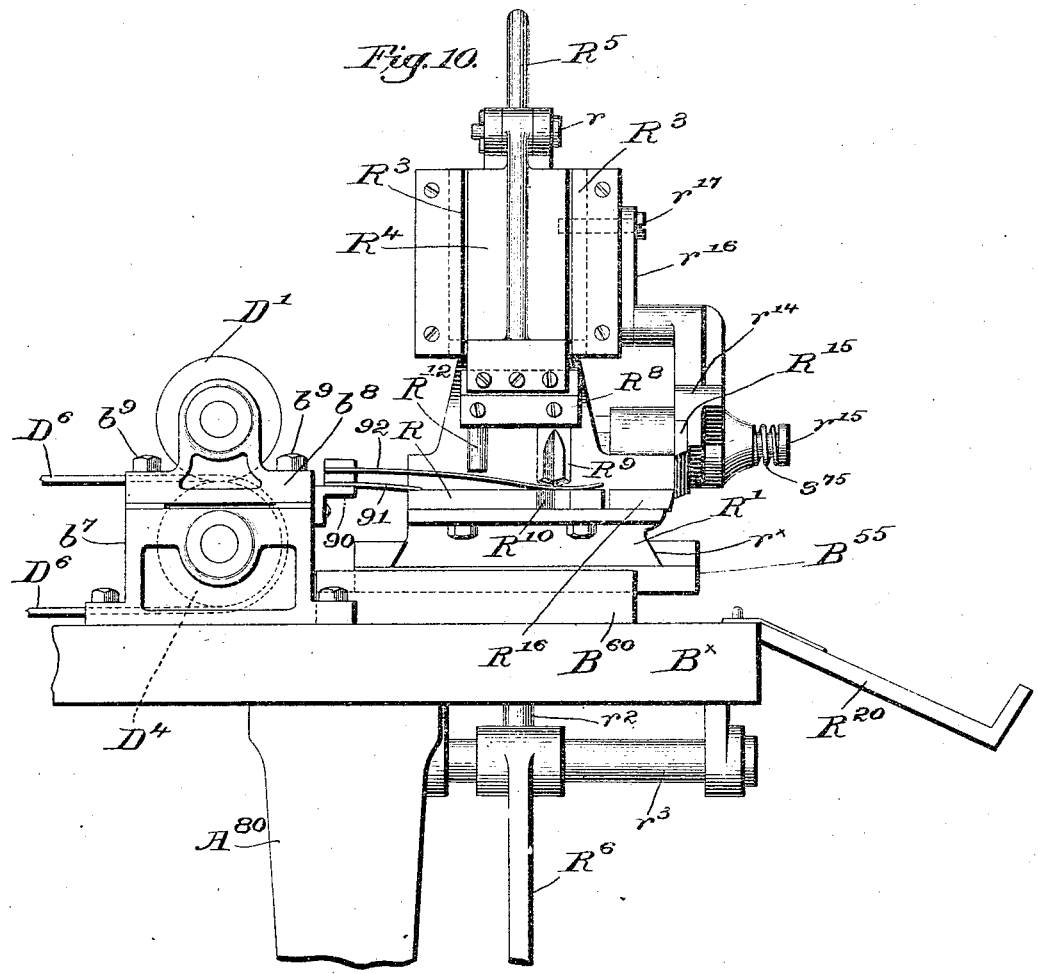
Figure 11:
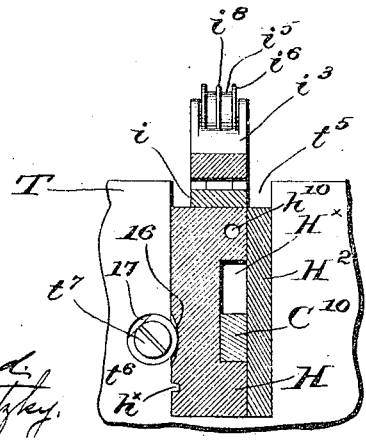

Figure 1 is a side elevation of a tag-making apparatus embodying one form of my invention with the feed mechanism ready to feed the webs forward. Fig. 2 is a top or plan view of the apparatus shown in Fig. 1, omitting the webs, the view being taken from the left-hand end of Fig. 1. Fig. 3 is an enlarged vertical sectional detail of a pair of feed and compression rolls on the line $x\, x$, Fig. 2, looking toward the right. Fig. 4 is an enlarged detail, partially in section, of a portion of the drawing-in mechanism. Fig. 5 is an elevation of the left-hand or delivery end of the apparatus shown in Fig. 1. Fig. 6 is a greatly-enlarged perspective view of an adjustable guide-roll for the web. Fig. 7 is an enlarged sectional detail of one of the feed-roll-actuating gears, taken on the line $x'\, x'$, Fig. 2, looking toward the right. Fig. 8 is a transverse sectional view, enlarged, of the means for presenting the free end of the fastener to the drawing-in mechanism, taken on the line $x^2\, x^2$, Fig. 2, looking toward the delivery end. Fig. 9 is a detail, partly in longitudinal section, of the jaw-carrier and gripping-jaws forming a portion of the drawing-in mechanism and also showing a part of the jaw-controller. Fig. 10 is an enlarged left-hand side elevation, viewing Fig. 2, of the tag notching, separating, or cutting mechanism located at the delivery end of the apparatus. Fig. 11 is a transverse section on the line $y\, y$, Fig. 8. Fig. 12 is a plan view of a portion of the apparatus to be described, showing the tags as they move along; and Fig. 13 is an enlarged detail of a downhold to be described.

I have herein shown the working parts of the apparatus as mounted on a box-like standard or base A of sufficient size and rigidity to firmly support the mechanism, said base, as herein shown, having two like brackets A A' extended therefrom at the receiving end of the apparatus and provided with suitable bearings $a'$ for the journals $a$ of the two rolls P P' of paper or other material from which the body portions of the tags are to be made, the rolls being suspended, as shown, between the brackets. A pan $A^2$ is suspended below the brackets by suitable hangers $a^2$, (see Fig. 1,) in which pan I have herein shown two distributing-rolls $p^2\, p^3$, mounted to rotate in suitable bearings and extended above the top of the pan and adapted to rotate partly immersed in the contents of the pan. The web $p$ is fed from the roll P downwardly around guide-rolls $a^3$ and $a^4$, located above and near the periphery of the distributer-roll $p^2$, so that as the roll passes from one to the other of said guide-rolls it will travel along in contact with the distributer-roll. From the guide-roll $a^4$ the web passes upward and over an adjustable guide-roll B, mounted in suitable bearings on uprights $A^8$, erected on the brackets A', the web thence passing to the feed mechanism, to be described. The web $p'$ passes downwardly around guide-rolls $a^5 a^6$, as shown by dotted lines, Fig. 1, and in contact with the periphery of the distributer-roll $p^3$, after which the web passes up over a guide-roll B', mounted on the standards $A^3$ above the roll B.

The two rolls B and B' are similarly constructed, and, referring to Fig. 6, the roll B is shown provided at one end with a fixed annular flange $b$ and at its other end with an annular flange $b'$, longitudinally adjustable on the roll and held in adjusted position thereon by a suitable set-screw $b^2$. By moving the adjustable flange in or out along the roll the distance between the fixed and the movable flange is varied to correspond to the width of the web, it being understood that the two webs will be of the same width, and, as shown in Fig. 1, they pass from the guide-rolls B B', one above the other, to be later superposed and pressed together. The rotation of the said rolls may be regulated by means of tension-journals, and, referring to Fig. 6, it will be noticed that the roll B has a conical recess $b^3$ in its end, the other end having a similar recess, and they are entered by conical-ended studs $b^4$, which have threaded shanks to pass through similarly-threaded openings in the adjacent portion of the standard, suitable check-nuts $b^\times$ serving to retain the bearing studs in adjusted position, the latter being provided, as herein shown, with suitable thumb-nuts by which they may be regularly regulated. Manifestly tightening up of the studs will act as a friction-brake to retard the rotation of the rolls to any desired extent. The several rolls $a^3 a^4 a^5 a^6$ are preferably similarly mounted, as herein shown, in order that they may coöperate in providing proper tension for the webs.

In Fig. 2 the free ends of the webs have not been shown as carried around the guide-rolls in order that the construction of the latter may be more clearly shown.

Paste, glue, or other suitable cementitious substance may be placed in the pan $A^2$, and the rotation of the distributers $p^2 p^3$ will serve to spread a portion of the cement upon the faces of the webs, which will be turned toward each other as the webs are fed from the guide-rolls B B', as will be manifest from an inspection of Fig. 1, and in order to prevent an improper amount of the cement being transferred I have provided scrapers $p^{20} p^{30}$ to act upon the distributers $p^2 p^3$ to scrape off surplus cement.

It is quite feasible, and at times it may be very desirable, to use paper or other material which has been glued upon one side and dried and thereafter put up into roll form, and my apparatus is adapted for the use of such material, as it is only necessary to place water in the tank $A^2$ in such instance to moisten one or both of the cement-laden faces of the material as the webs pass from the supply-rolls to the feed mechanism of the apparatus.

The base A has erected upon it and extended longitudinally in the opposite direction to the brackets A' and above the tops of the latter a bed-plate $B^\times$, provided at one of its edges with a longitudinal undercut groove $b^6$, Figs. 1 and 5, to receive a sliding carriage C, provided with rack-teeth $c'$ at its upper face. A series of stands $b^7$, herein shown as three in number and arranged in opposite pairs, are secured to the bed-plate to form bearings for the journals $d$ of the lower feed and compression rolls D, preferably made of metal and, as best shown in Fig. 3, covered with a layer $d^\times$, preferably of rubber, or it may be other suitable yielding material.

The "bed-rolls" D, as they may be termed, are mounted in fixed bearings; but the upper rolls D', which are made, preferably, of hardened steel, have their shafts $d'$ mounted in caps $b^8$, all adjustably held on the tops of the standards by screw-bolts $b^9$, there being sufficient clearance between the standards and the caps to permit of variation in the pressure between the bed and top rolls. These rolls operate to feed the webs longitudinally and also to compress them firmly one upon the other as they pass through the apparatus after the flexible strengthener, which may be a cord, tape, string, or wire, has been laid between the webs or plies before the latter have been subjected to pressure. The journals or shafts $d$ or the bed-rolls are extended beyond the standards at the rear of the machine and have secured thereto the hubs $d^2$ of ratchet-wheels $d^3$, (see Fig. 7,) each held securely upon the shaft by a screw-pin 3, the smooth shank of which enters a radial hole 4 in the shaft $d$, while the threaded head of the pin enters the hub $d^2$. A gear $d^4$ is loosely mounted on the shaft $d$, adjacent the ratchet, the inner face of the gear being provided, as herein shown, with two substantially diametrically-opposite pawls $d^5$, held in operative position by suitable springs $s$ to engage the teeth of the ratchet, and by having the two pawls a very fine adjustment is attained, because with a given number of ratchet-teeth the use of the two pawls is substantially equivalent in result to a single pawl with a ratchet of double the number of teeth. The several gears $d^4$ are in mesh with the rack-teeth $c$ on the carrier C, and when the latter is moved in the direction of the arrow 5, Fig. 1, the several gears will be rotated in the direction of the arrow 6, Fig. 7, the pawls at such time engaging the ratchet-teeth, and thereby rotating the several bed-rolls D, the top rolls D' being rotated by surface friction. When the carriage moves oppositely to the arrow 5, the pawls will click over the ratchet-wheels and the rolls D D' will not rotate, the plies of material held between the pairs of rolls at such time remaining stationary. I thus provide for an intermitting feed motion, the period of rest being utilized to draw in a fastener and to sever a completed tag at the delivery end of the apparatus.

The base A has an arm $A^6$, rigidly extended from the front and provided with a bearing $A^7$ for the main driving-shaft $B^3$, extended through the base and having fast upon it at the back of the base a disk $B^4$, radially grooved at $b^{10}$, Fig. 1, to receive an adjustable wrist-pin $b^{12}$, pivotally connected by a link $b^{13}$ with one end of the rocker-arm $b^{14}$, fulcrumed at $b^{15}$ on the base, and pivotally connected at its other end by a short link $b^{22}$ to the carriage C, so that the latter will be reciprocated as the disk $B^4$ is rotated. The rotation of the shaft $B^3$ is effected in any suitable manner, as by a belt (not shown) passed around the pulley $B^5$ from a suitable source of power. By varying the position of the crank-pin $b^{12}$ relatively to the center of the disk $B^4$ the throw of the carriage C can be varied, and thereby regulate the extent of feed movement of the superposed plies for each stroke of the carriage in the direction of the arrow 5.

A table T, substantially ⌐⌐-shaped in cross-section, is mounted upon the bed-plate $B^\times$ and is extended longitudinally thereof, as shown in Figs. 1 and 2, the downturned flanges $t$ and the top of the table being transversely slotted at $t'$ to receive the rolls D D', as clearly shown in Figs. 2 and 3, the top of the table being in a plane tangential to the rolls D D', said table receiving the superposed plies or webs and supporting the same as they pass through the feed and compression rolls. The guide-roll B is below the top of the table, as shown in Fig. 1, so that the lower ply, passing from said guide-roll to the table, will be held flat upon it until it reaches the first pair of feed-rolls, while the upper ply, coming from the guide-roll B', extends in an inclined plane directly from said guide-roll to the nip of the first pair of feed-rolls, the upper ply being guided along one edge by an upturned gage $g$, the slotted foot $g'$ of which is held in adjusted position by a set-screw 6, which enters a supporting-block $g^2$, held in a transverse groove $p^\times$, made in the top of the table. Like edge-gages $g^\times$ are preferably located one between each set of feed-rolls, as best shown in Fig. 2, to act upon the edges of the superposed webs and maintain them in accurate alinement when passing through the apparatus. The shaft $d$ of the last bed-roll of the series has fixedly mounted upon it a roll D of substantially the diameter of the bed-roll, a second roll $D^5$ of the same diameter being mounted on a stand $d^8$, secured to the side of the table T, and an endless band $D^6$ is passed around said rolls to constitute a traveling support movable adjacent the table at the front of the machine, said support moving in unison with the feed of the work and stopping when the work is stationary, for a purpose to be described. An upturned stand $A^{10}$ on the back of the base supports a shelf $f^\times$, on which I have herein shown the upright spindles $f$, on which are rotatably mounted spools or drums $f'$, on which the material $f^2$ to form the strengthener is wound, whether it be tape, cord, wire, &c., two spools being herein shown, as I prefer to make the strengthener duplex, as in the patent referred to. The strands $f^2$ pass through a guide-eye $f^3$ on a rod $f^4$ vertically adjustable in the shelf $f^\times$ by a suitable set-screw 15. (See Fig. 5.) As shown, the upper ends of the spindles are threaded to receive nuts $f^5$ thereon, between which and the tops of the spools are interposed springs $s^5$ to exert proper tension and prevent too rapid unwinding or overrunning of the strands.

Opposite to the stand $A^{10}$ the table T is transversely slotted, as at $t^5$, Fig. 11, to receive therein a chambered block H, (shown in section, Fig. 8,) the block having a longitudinal groove $h^\times$ therein to receive a positioning-rib $t^6$ on the table, while a headed stud $t^7$, Fig. 11, enters a notch 16 in the block to prevent longitudinal movement thereof, the head of the stud being slabbed off at 17 to permit removal of the block when desired. A plate H' normally rests on the top of the block, and its top at such time lies flush with the table-top, said plate, which I shall hereinafter designate as the "platen," being rigidly secured to two lifter-rods $h$, extended through the block and the bed $B^\times$ of the apparatus, strong springs $S^5$ interposed between collars $h'$ on the rods and the under side of the block H normally maintaining the platen lowered. The rods are longitudinally slotted at $h'$ to receive a controlling-cam $C^{10}$, shown as a bar having lifting portions $c^{10}$ on its upper edge and a depressing-cam $c^{12}$ on its lower edge, the cam passing through the chamber $H^\times$ in the block and held in place by a cover-plate $H^2$, Fig. 11. A roller or other stud $h^2$ is mounted in the slot $h'$ of each lifter-rod to travel on the adjacent portion $c^{10}$ of the lifter-cam when the latter is moved longitudinally, as described, movement to the right, Fig. 8, operating to lift the platen H' against the spring $S^5$, elevation of the platen raising the lower ply or web $p$, for a purpose to be described. The block has secured to it at its end nearest the back of the machine means to present the strand or strands $f^2$ of the strengthener to the drawing-in mechanism, said means comprising a plate $i$, secured to the block H, as by screws 18, and having ears $i^2$, in which a roll $i^\times$ is mounted, a rocking arm $i^3$, fulcrumed on the plate at $i^4$, being bifurcated at its inner end to support a second roll $i^5$ above the roll $i^\times$ and provided with end flanges $i^6$. A spring $s^6$ acts upon the outer end of the arm $i^3$ to press the rolls yieldingly together, separation of the latter being regulated by a threaded adjusting-stud $i^7$, carried by the rocker-arm, the two strands $f^2$ being divided by a separator $i^8$, shown as a finger mounted on the rocker-arm and resting on the periphery of the roll $i^5$, the flanges of the latter preventing lateral displacement of the strands, which are led from the guide-eye $f^3$ down to and between the rolls, as shown in Fig. 8. Just in front of the rolls a vertically-movable knife or cutter carrier $H^3$ is mounted in a recess $h^3$ in the block H, the carrier being slotted at its lower end at $h^4$ to receive the cam-bar $C^{10}$, a roll $h^5$ on the carrier being at times engaged by the depressing-cam $c^{12}$. The part of the carrier above the platen has an opening $h^6$, at the top of which is secured the movable cutter or blade $h^7$, the edge of which is preferably inclined to the horizontal to coöperate with a fixed blade $h^8$, set into a recess in the rear edge of the platen H', so that when the carrier $H^3$ is depressed by engagement of the roll $h^5$ and cam $c^{12}$ the blades $h^7$ and $h^8$ will pass by each other. The throw of the cams $c^{10}$ and $c^{12}$ is such and they are so timed that the cutting action of the blades is effected about at a point on a level with the nip of the presenting-rolls, the office of the blades being to cut the strands $f^2$ after a sufficient length has been drawn off, and by making the cut as indicated the ends of the strands are not distorted, but left in the position shown in Fig. 8, ready to be engaged at the next operation of the drawing-in mechanism. A spring $S^6$ normally maintains the knife-carrier $H^3$ in raised position, (shown in Fig. 8,) and said carrier is yieldingly pressed toward the blade $h^8$ by means of a plunger $h^9$ in a hole $h^{10}$ in the block H, the plunger being controlled by a spring $S^7$, held in the hole by a suitable plug $h^{12}$.

A flat blade-like presser $h^{15}$ is secured to the cutter-carrier at its upper end and extends above and longitudinally of the platen, rising and falling with the said carrier, the upper ply of material $p'$ passing above the presser, so that when the platen and presser are moved toward each other the latter will press the strand or strands $f^2$ of the strengthener upon the cement-laden upper surface of the web or ply $p$, to be thereby positioned before the upper ply is superposed and compressed upon it. This insures the correct positioning of the strengthener relative to the plies, the strengthener being held taut at the time by the drawing-in mechanism, now to be described.

Referring to Fig. 2, the arm $A^6$ is provided with a transverse bearing $A^{12}$ for a short shaft $k$, provided at one end with a bevel-gear $k'$ in mesh with a like gear $B^{30}$ on the main shaft, the other end of the short shaft $k$ having secured thereto a disk K, Fig. 5, radially grooved at $k^\times$ to receive an adjustable wrist-pin $k^2$, extended loosely through a longitudinal slot $k^3$ in the lower end of a lever K', fulcrumed at $k^4$ on the arm $A^6$. I have also shown the upper end of the lever as slotted at $k^5$ to receive a pin or stud $k^6$, extended laterally from a cross-head $K^2$, mounted to slide in a grooved guideway $a^{16}$ in the side of a stand $A^{16}$, rigidly secured to and extended from the bed-plate of the machine at right angles to the line of feed and nearly opposite the platen H'. The cross-head has mounted upon it an upturned block $k^7$, through which is extended the carrier for the drawing-in nippers or jaws, said carrier being shown as a rod $m$, held in longitudinal adjustment in the block $k^7$ by a suitable set-screw $k^8$ and supported at such a height that its inner end will move slightly above the platen H' when the cross-head is on the inward stroke, as shown in Fig. 8, the parts being therein shown with the drawing-in nippers just approaching the presenting means to grasp the strengthener $f^2$.

The inner end of the carrier $m$ is longitudinally bored, as at $m'$, Fig. 9, to receive the nippers or jaws $m^\times$, shown herein as spring-arms forming part of a cylindrical jaw-head $m^2$, having an easy fit in the bore $m'$, the outer ends of the jaws or nippers being oppositely beveled at top and bottom, as at $m^3$, to form a tapering nose when the jaws are closed, as in Fig. 9, the inner faces of the jaws being preferably toothed or serrated, as shown at $m^4$. The tubular portion of the carrier is longitudinally slotted at opposite sides at $m^5$ to receive a pin 50, driven through the head $m^2$ and extended at its ends into one member of a jaw-releasing device, shown as a sleeve $m^6$, mounted to slide on the carrier, the other member of said device being shown as a tube $n$, through which the carrier $m$ slides and by which it is also guided, said tube having a flange $n'$, against which bears one end of a spring $s^{10}$, (see Fig. 4,) the other end of the spring resting against one end of a case N, having a slotted foot $n^\times$, the opposite end of the case forming a stop for the flange $n'$. By suitable set-screws 60, passed through the slotted foot $n^\times$ into the stand $A^{16}$, the releasing device may be varied as to its position to change the point in the path of the carrier $m$ at which the jaws will open, as will be described. The reciprocation of the cross-head $K^2$ is so timed that the drawing-in jaws $m^\times$ will move forward across the traveling support $D^6$ and the platen H' up to and to engage the strand or strands $f^2$ of the strengthener and to be withdrawn to the position shown in Figs. 2 and 5 while the feed mechanism is at rest.

Supposing now that the parts are in the position shown in Figs. 2 and 5, continued rotation of the disk K will operate to move the carrier $m$ to the right, the jaws being open in the position shown in Fig. 8, until the beveled ends $m^3$ of the jaws engage the presenting device, herein shown as the rolls $i^\times i^5$, such engagement acting to stop the forward movement of the jaws before the carrier $m^\times$ has completed its stroke, and as the latter completes its stroke the pin 50 will slide from the outer to the inner ends of the slots $m^5$, the tubular end of the carrier sliding along the outer edges of and compressing the jaws tightly together, and upon the strand or strands $f^2$, which have been positioned by the presenting device to be so engaged by the jaws. After the jaws have been thus closed the carrier is moved to the left, Figs. 2 and 5, pulling off the strand or strands and drawing them across and above the lower ply or web $p$ and the traveling support $D^6$, the drawing off continuing until the inner end of the sleeve $m^6$ engages the spring-controlled guide-tube $n$, and after such engagement the carrier $m$ completes its outward stroke, effecting a relative sliding movement of the sleeve on the carrier toward the tips of the jaws, and as the pin 50 is extended into the sleeve the jaws will be moved outward relatively to the carrier until the pin 50 is again brought up against the outer ends of the slots, the jaws separating as soon as they are pushed out from the tubular part of the carrier and releasing the strengthener $f^2$. To insure the disengagement of the strengthener from the jaws when thus opened, I have herein shown a light spring-finger $s^{20}$ attached to the casing N and bent at its outer end across the path of the jaws, the inward movement of the latter pressing the finger to one side. As the carrier returns on its outward stroke the finger $s^{20}$ snaps back into normal position as soon as the tips of the jaws pass it, such action of the finger serving to positively throw off the strengthener from the jaws. The cam-bar $C^{10}$ has its shank extended, as at $C^{20}$, Fig. 5, alongside of the vertical face of the stand $A^{16}$, below the cross-head $K^2$, a spring $s^{50}$, attached at one end to the shank and at its other end to some fixed part of the apparatus, normally maintaining the cam-bar in the position shown in Fig. 8. A lug $c^{40}$ on the cam-bar is adapted to be engaged by an adjustable dog $k^{40}$, mounted on the cross-head and regulated as to its position by means of suitable set-screws 70, passed through a longitudinal slot in the dog and into the cross-head, the dog being so set that it will engage the lug $c^{40}$ on the cam-bar after the drawing-in jaws have passed from between the plies of material, the cam-bar thereafter moving in unison with the cross-head to the left, Figs. 2 and 5, to raise the platen H′, as has been described, raising the lower ply $p$ up to the stretched fastener and at the same time bringing the presser $h^{15}$ down to press the strengthener upon the cemented upper surface of the said lower ply, the upward movement of the platen and the downward movement of the cutter-carrier $H^3$ being completed just as the drawing-in jaws release the flexible strengthener, so that the strand or strands $f^2$ are severed by the knives or blades $h^6 h^3$. The tacky surface of the lower web holds the strengthener in position after it has been pressed down by the presser $h^{15}$, so that when the feed is resumed the said fastener will remain in its proper position as the upper web is brought upon the lower one, and the two are pressed together by the first pair of compression-rollers.

By reference to Fig. 8 it will be manifest that the compression between the platen and the presser will be varied according to the extent of movement of the cam-bar $C^{10}$ to the right, and such movement of the latter is regulated by adjusting the dog $k^{40}$ on the cross-head, a greater amount of compression being desirable when the material is thick than when it is thin. By moving the dog to the right, viewing Fig. 5, the cam-bar will not be moved so far by the cross-head, and the compression consequently will be less than when the dog is moved more to the left.

The feed movement of the web alternates with the operation of the drawing-in mechanism, and consequently a series of strengthening members will be laid between the two webs or plies of material at equal distances apart, the free ends of the strengtheners resting on the traveling support $D^6$, which, it will be remembered, has the same movement as the superposed webs.

Referring to Fig. 21, where a part of the mechanism has been omitted, it will be seen that the movement of the support $D^6$ with the material serves to maintain the free ends of the fasteners substantially in parallelism and prevents their tangling or engagement one with the other, so that as the tags are separated later on they may drop one by one into any suitable receptacle. The spring-finger $s^{20}$ is in the nature of a throw-off device and insures the absolute disengagement of the end of the strengthener from the jaws of the drawing-in mechanism when said jaws are open. As the two-ply strip of material leaves the last pair of compression-rollers of the series its leading end passes from the table T upon the face-plate R of a frame comprising a base-plate R′, preferably mounted to move transversely in an undercut guideway $r^x$ in a foot $B^{35}$, mounted in a longitudinally-grooved stand $B^{60}$ on the bed-plate $B^x$, said base having an upturned overhanging arm $R^2$ transverse to the line of feed and provided with guideways $R^3$, in which is mounted a vertically-reciprocable cross-head $R^4$, pivotally connected at $r$ to one end of a rocking beam $R^5$, fulcrumed on the arm at $r'$, the other end of the beam being connected by a link $r^2$ with a bell-crank lever $R^6$, fulcrumed on the frame at $r^3$, as clearly shown in Fig. 5. The bell-crank lever is connected by an adjustable link or pitman with a wrist-pin $r^4$, adjustable in a radial slot $r^5$ of a disk $R^7$ on a long shaft $r^6$, (see dotted lines, Fig. 5,) held in a suitable bearing in the arm $A^6$ and in a hanger $A^{80}$, and provided with a bevel-gear $r^8$, in mesh with a similar gear $B^{35}$ on the main driving-shaft. (See Fig. 2.) The pitman is herein shown as comprising two members 80 and 81, adjustably connected by a coupling 82, so that the effective length of the pitman may be varied, such adjustment, in connection with the adjustment of the wrist-pin $r^4$, varying the throw of the rocking beam $R^5$ to thereby change the throw of the cross-head $R^4$.

Referring to Fig. 10, the cross-head is transversely grooved at its lower end to receive a die-block $R^8$, to which is secured a suitable notching-die $R^9$, having a V-shaped acting end and coöperating with a similarly-shaped recess $R^{10}$ in the grooved edge of the face-plate, the cross-head descending while the feed mechanism is at rest to cut out a V-shaped notch $v$, Fig. 12, in the edge of the double ply or strip of material, the apex of the notch being intersected by the line $v'$, Fig. 12, on which the web is to be transversely severed to separate one tag from another, the transverse dotted lines in Fig. 12 indicating such lines of separation. On the die-block $R^8$, I may also place a stamp $R^{12}$, having any suitable lettering or characters thereupon to stamp each tag, the position of the stamp relative to the tag being shown at $v^2$, Fig. 12.

To facilitate the passage of the material from the last pair of compression-rolls to the face-plate R, especially when operating on thin stock, I have attached a bracket 90 to a fixed apparatus, (see Fig. 10,) said bracket having fingers 91, which bridge over the space between the face-plate and the end of the table T, and above the bridge so formed I mount in the bracket, preferably, spring-tongue holds 92, which lightly bear upon the work as it is fed under the die to the transverse cutter or separating blade $R^{15}$, which is mounted, as will be described, to coöperate with a fixed blade $R^{16}$, secured to the base R'. The blade $R^{15}$ is attached to a blade-carrier $r^{14}$, pivoted at $r^{15}$ to the overhanging arm $R^2$, said blade-carrier being pivotally connected by a link $r^{16}$ with a stud $r^{17}$, extended into the cross-head $R^4$ through a vertical slot 100 (see Fig. 5) in one of the guides $R^3$, the reciprocation of the cross-head moving the knife $R^{15}$ up and down with a shearing cut adjacent the cutting edge of the fixed blade $R^{16}$. The fulcrum $r^{15}$ is extended beyond the carrier $r^{14}$, and a spring $s^{75}$, Fig. 10, is interposed between the hub of the carrier and the head of the fulcrum-stud to maintain the movable blade with a yielding pressure against the fixed blade $R^{16}$. The mechanism is so arranged that the endmost card is severed from the strip or web of material, the notch $v$ made between the next two tags, and the stamp impressed on another tag yet to be severed simultaneously, the severed tag falling into any suitable receptacle, or it may be upon a receiver $R^{20}$, shown in Fig. 10 as mounted on the bed-plate of the machine and extended beyond the end thereof to receive the severed tags as they drop from the severing mechanism. The base R' being adjustable transversely to the feed in the undercut groove $r^x$ provides for regulating the die $R^9$, so that the notch shall be cut in the proper place relatively to the width of the stock, and by adjusting the foot $B^{55}$ longitudinally in the stand $B^{60}$ the accuracy of the transverse cut can be obtained with the greatest nicety to come precisely half-way between two adjacent fasteners, the die-block $R^8$ being adjustable in the cross-head to insure the intersection of the apex of the notch and the line of division or severance $v'$ of the web.

It will be manifest that the cementitious material may be applied to the inner face of either or both of the webs of material, and either or both of the plies may be glued paper suitably moistened by the mechanism shown herein or in any suitable manner. So, too, a greater or less number of strands than I have herein shown may be used to compose each fastener.

My invention is not restricted to the precise construction and arrangement of parts herein shown and described nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

Having fully described my invention, what I claim as new, and desire to secure by Letters Patent, is—

1. In an apparatus of the class described, mechanism to feed longitudinally and superpose two plies of material furnished with cement, drawing-in mechanism to lay a flexible strengthener between and transversely to and beyond the plies at predetermined intervals, and means to sever the superposed plies transversely between the series of strengtheners.

2. In an apparatus of the class described, mechanism to feed longitudinally and intermittingly two plies of material furnished with cement and to press them together, drawing-in mechanism to lay a flexible strengthener between and transversely to the plies when feed is stopped, and means to sever the superposed plies between the series of strengtheners.

3. In an apparatus of the class described, mechanism to feed longitudinally two plies of material, drawing-in mechanism to draw a length of flexible strengthener from a source of supply and to lay it between and transversely to and beyond the plies, means to sever from the source of supply the length of strengthener so laid, and means to sever the superposed plies between the series of strengtheners, the line of severance being parallel with that of the strengtheners between the plies.

4. In an apparatus of the class described, mechanism to feed longitudinally and superpose two plies of material furnished with cement, drawing-in mechanism to draw a length of flexible strengthener in two strands from a source of supply and lay it between and transversely to the plies and extended beyond one edge thereof, and means adjacent the opposite edge of the plies to sever from the source of supply the length of strengthener when laid.

5. In an apparatus of the class described, mechanism to draw a length of flexible strengthener from a source of supply and to lay it between and transversely to the plies, means to sever from the source of supply the length of strengthener so laid, means operative independently of said severing means to separate the plies into tags, and presenting mechanism to present the severed end of the strengthener to the drawing-in mechanism at the next operation thereof.

6. In an apparatus of the class described, mechanism to feed longitudinally and superpose two plies of material furnished with cement, drawing-in mechanism to lay lengths of a flexible strengthener between and transversely to the plies at predetermined intervals and projecting beyond the plies at one edge, a traveling support for such projecting ends, means to operate said traveling support in unison with said ply-feeding mechanism, and means to sever the superposed plies between the series of strengtheners.

7. In an apparatus of the class described, mechanism to feed longitudinally and superpose two plies of material furnished with cement, drawing-in mechanism to draw from a source of supply lengths of a flexible strengthener and to lay the same at intervals between and transversely to the plies, means to sever each length from the supply, a device to hold the severed end in position to be engaged by the drawing-in mechanism at its next operation, and means to sever the plies transversely between the series of strengtheners in parallelism with the line of disposition of the strengtheners between the plies.

8. In an apparatus of the class described, mechanism to feed longitudinally and superpose two plies of material, the inner face of one of the plies having cement thereupon, drawing-in mechanism to lay a flexible strengthener between and transversely to the plies, a platen and a presser arranged at opposite faces of the cemented ply, and means to effect relative movement of the platen and presser to force a strengthener into close contact with the cemented surface of the ply passing between them.

9. In an apparatus of the class described, a series of feed and compression rolls to receive between them two plies of material, the inner face of one of the plies having cement thereupon, means to intermittingly rotate said rolls and thereby effect feed of the material, drawing-in mechanism to lay a length of flexible strengthener between and transversely to the plies before they pass between the rolls, and independent means to press the laid strengthener upon the cemented surface of the ply so provided.

10. In an apparatus of the class described, mechanism including pairs of intermittingly-rotated rolls, to feed longitudinally and superpose two separated plies of material furnished with cement, a table to support the material between the rolls, the feed-rolls being substantially tangent to the top of the table, means to actuate the feed-rolls, and drawing-in mechanism to lay a flexible strengthener between and transversely to and beyond the plies at predetermined intervals.

11. In an apparatus of the class described, mechanism including feed-rolls to feed longitudinally and intermittingly two plies of material superposed and provided with cement, drawing-in mechanism to draw a length of flexible strengthener from a source of supply and lay it between and transversely to the plies with the fastener projecting beyond one edge of the plies, means to sever from the source of supply the length of strengthener so laid, and a traveling support for the projecting ends of the strengtheners movable in unison with the rolls of the feed mechanism.

12. In an apparatus of the class described, a series of feed and compressing rolls arranged in pairs, one roll of each pair having a yielding surface, means to vary the pressure between the rolls of each pair, a table the top of which is tangential to the two rolls of each pair, and edge-guides mounted on the table and adjustable transversely thereof, to guide the edge of a web material as it is passed through the rolls.

13. In an apparatus of the class described, intermittingly-operated mechanism to feed longitudinally and superpose two plies of material, means to vary the length of feed, drawing-in mechanism movable transversely to the line of feed to lay a flexible strengthener between and transversely to the plies of material, and means to sever the superposed plies transversely between the series of strengtheners.

14. In an apparatus of the class described, mechanism to feed and superpose two plies of material, furnished with cement, drawing-in mechanism to draw a length of flexible strengthener from a source of supply and to lay it between and transversely to and beyond the plies, a device to present the strengthener to the drawing-in mechanism, means to sever the strengthener when drawn off, and a releasing device to release the strengthener from the drawing-in mechanism.

15. In an apparatus of the class described, mechanism to feed and superpose two plies of material furnished with cement, drawing-in mechanism to draw in a length of flexible strengthener from a source of supply and to lay it between and transversely to the plies, a device to present the strengthener to the drawing-in mechanism, cutting mechanism located in front of said presenting device and at the side of the superposed plies.

16. In an apparatus of the class described, mechanism to feed longitudinally two superposed plies of material, drawing-in mechanism including a reciprocating cross-head and jaws movable thereby transversely to and between the plies of material, to lay a flexible strengthener between said plies, a presenting device to present the free end of the strengthener to the jaws, means to sever the strengthener when laid in place, and actuating connections between said severing means and the cross-head and operated by the latter.

17. In an apparatus of the class described, a platen, an opposed presser, drawing-in mechanism a portion of which is reciprocable between said platen and presser, and actuating mechanism controlled by or through the drawing-in mechanism, to effect movement of the platen and presser toward each other when the drawing-in mechanism has drawn a strengthener into place.

18. In an apparatus of the class described, a platen, an opposed presser, drawing-in mechanism a portion of which is reciprocable between said platen and presser, actuating mechanism controlled by or through the drawing-in mechanism, to effect movement of the platen and presser toward each other when the drawing-in mechanism has drawn a strengthener into place, and means to adjust the actuating mechanism to vary the stroke of the platen and presser according to the thickness of the material to pass therebetween.

19. In an apparatus of the class described, mechanism to feed longitudinally two superposed plies, means for covering the inner face of one of the plies with cement, mechanism to draw in a length of flexible strengtheners from a source of supply between and transversely to and beyond said plies, said mechanism comprising a reciprocating carrier, separable jaws mounted thereon and means for presenting the end of the flexible strengthener to said jaws.

20. In an apparatus of the class described, drawing-in mechanism comprising a reciprocable carrier having a tubular end, separable jaws mounted in the tubular end of the carrier and having a longitudinal movement relative thereto, means to engage said jaws and effect their partial movement into the tubular end of the carrier, to close them, and independent means to open the jaws.

21. In an apparatus of the class described, drawing-in mechanism comprising a reciprocating carrier having a tubular end, spring-jaws mounted in said tubular end and movable longitudinally relative thereto, a sleeve surrounding the carrier and connected with the jaws, and means to engage and stop the sleeve before the carrier reaches the end of its return stroke, to thereby open the jaws.

22. In an apparatus of the class described, drawing-in mechanism comprising a reciprocable carrier having a tubular end provided with a longitudinal slot in the wall thereof, connected spring-jaws mounted in said tubular end and movable longitudinally relatively to the carrier, a sleeve loosely surrounding the carrier adjacent its tubular end, a pin connecting said sleeve and jaws and passing through the slot in the carrier, means to present the end of a strengthener to said jaws and to also stop the movement of the latter before the carrier has completed its outward stroke, to thereby effect movement of the jaws and sleeve inward relatively to the end of the carrier, and a releasing device to engage the sleeve and stop its movement prior to the stoppage of the carrier on its return stroke, to thereby open the jaws.

23. In an apparatus of the class described, drawing-in mechanism including a carrier, and a pair of jaws mounted thereon, means to present to the jaws the end of a flexible strengthener and also to effect closure of the jaws thereupon, independent means to open the jaws and release the strengthener, and a releasing device to directly engage the strengthener and remove it from the jaws as the latter are opened.

24. In an apparatus of the class described, a platen, a cutting-blade mounted thereon, a vertically-reciprocating carrier, a blade carried thereby, actuating mechanism for the carrier, drawing-in mechanism to draw a flexible strengthener across said platen, and means to control the carrier-actuating mechanism by or through said drawing-off mechanism.

25. In an apparatus of the class described, intermittingly-rotatable feed-rolls to feed longitudinally and press together two plies of material furnished with cement, an endless belt, means to move it in unison with said rolls, drawing-in mechanism to lay a flexible strengthener between and transversely to the plies and extending beyond one edge of the latter upon said belt, severing mechanism to sever the length of fastener so laid adjacent the opposite longitudinal edge of the plies, and means to sever the plies transversely between the series of laid fasteners.

26. In an apparatus of the class described, mechanism to feed longitudinally and superpose two plies of material furnished with cement, drawing-in mechanism to lay a flexible strengthener between and transversely to the plies at predetermined intervals, means to sever the superposed plies transversely between the series of strengtheners, and means to intermittingly notch one edge of the plies, the line of severance of the plies intersecting the apex of the notch.

27. In an apparatus of the class described, a vertically-reciprocating cross-head, a V-shaped notching-die carried thereby, a coöperating fixed die, means to feed two superposed cemented plies of material between the two dies, drawing-in mechanism to lay a flexible strengthener between and transversely to the plies at predetermined intervals, and means controlled by reciprocation of the crosshead to sever the plies after they have been notched, the line of severance intersecting the apex of the notch.

In testimony whereof I have signed my name to this specification in the presence of two subscribing witnesses.

GUSTAF L. REENSTIERNA.

Witnesses:
JOHN C. EDWARDS,
EMMA J. BENNETT.